United States Patent
Takeya et al.

(10) Patent No.: US 12,187,249 B2
(45) Date of Patent: Jan. 7, 2025

(54) VEHICLE CONTROL DEVICE

(71) Applicant: ADVICS CO., LTD., Kariya (JP)

(72) Inventors: Hirotaka Takeya, Kariya (JP); Keita Nakano, Kariya (JP)

(73) Assignee: ADVICS CO., LTD., Kariya (JP)

( * ) Notice: Subject to any disclaimer, the term of this patent is extended or adjusted under 35 U.S.C. 154(b) by 762 days.

(21) Appl. No.: 17/429,020

(22) PCT Filed: Feb. 25, 2020

(86) PCT No.: PCT/JP2020/007285
§ 371 (c)(1),
(2) Date: Aug. 6, 2021

(87) PCT Pub. No.: WO2020/175419
PCT Pub. Date: Sep. 3, 2020

(65) Prior Publication Data
US 2022/0017056 A1    Jan. 20, 2022

(30) Foreign Application Priority Data

Feb. 25, 2019   (JP) .................................. 2019-032050

(51) Int. Cl.
*B60W 10/04*     (2006.01)
*B60T 7/12*      (2006.01)
(Continued)

(52) U.S. Cl.
CPC .............. *B60T 13/741* (2013.01); *B60T 7/12* (2013.01); *B60T 8/88* (2013.01); *F16D 65/18* (2013.01); *F16D 2121/18* (2013.01)

(58) Field of Classification Search
USPC .................................................. 701/70–98
See application file for complete search history.

(56) References Cited

U.S. PATENT DOCUMENTS 5,615,933 A *  4/1997  Kidston ................... B60T 1/10
                                                    303/3
8,271,178 B2 * 9/2012  Matsubara ............. B60K 6/445
                                                    701/79
(Continued)

FOREIGN PATENT DOCUMENTS

CN      101454117 A      6/2009
JP      2013060197 A     4/2013
(Continued)

OTHER PUBLICATIONS

International Search Report (PCT/ISA/210) with translation and Written Opinion (PCT/ISA/237) mailed on May 26, 2020, by the Japan Patent Office as the International Searching Authority for International Application No. PCT/JP2020/007285. (9 pages).

*Primary Examiner* — Jonathan L Sample
(74) *Attorney, Agent, or Firm* — BUCHANAN INGERSOLL & ROONEY PC (57) ABSTRACT

The present invention relates to, for example, a vehicle control device including a driving force control unit that controls a driving force generated by a wheel of a vehicle; and a braking force control unit that controls a braking force generated by the wheel; where the driving force control unit generates the driving force of a first prescribed amount and the braking force control unit generates the braking force of a second prescribed amount to control the speed of the vehicle to be constant; and acceleration or deceleration are both controllable by performing one of control of the driving force by the driving force control unit and control of the braking force by the braking force control unit.

3 Claims, 9 Drawing Sheets

(51) Int. Cl.
  *B60T 8/88*   (2006.01)
  *B60T 13/74*   (2006.01)
  *F16D 65/18*   (2006.01)
  *F16D 121/18*   (2012.01)

(56) References Cited

U.S. PATENT DOCUMENTS

| | | | | |
|---|---|---|---|---|
| 8,868,274 | B2* | 10/2014 | Shiiba | B60W 10/11 |
| | | | | 701/87 |
| 2005/0209760 | A1* | 9/2005 | Tabata | B60K 6/547 |
| | | | | 701/53 |
| 2008/0100129 | A1* | 5/2008 | Lubbers | B60L 7/18 |
| | | | | 303/113.1 |
| 2009/0289402 | A1* | 11/2009 | Tomioka | B60R 13/02 |
| | | | | 269/55 |
| 2012/0046844 | A1* | 2/2012 | Okada | B60W 30/18027 |
| | | | | 701/70 |
| 2012/0203416 | A1* | 8/2012 | Yoshimura | B60L 15/2045 |
| | | | | 903/902 |
| 2012/0319465 | A1* | 12/2012 | Koyama | B60T 13/662 |
| | | | | 303/3 |
| 2015/0224991 | A1* | 8/2015 | Sudou | B60W 10/06 |
| | | | | 701/96 |
| 2015/0283983 | A1* | 10/2015 | Georgi | B60L 7/18 |
| | | | | 701/70 |
| 2016/0214595 | A1* | 7/2016 | Baehrle-Miller | B60T 17/221 |
| 2016/0334790 | A1* | 11/2016 | Rust | B60T 13/662 |
| 2017/0297573 | A1* | 10/2017 | Fraser | B60T 7/22 |
| 2018/0170381 | A1* | 6/2018 | Kamatani | B60W 30/16 |
| 2019/0389468 | A1* | 12/2019 | Fritz | B60W 10/08 |
| 2021/0061240 | A1* | 3/2021 | Zhang | B60T 13/686 |

FOREIGN PATENT DOCUMENTS

| | | | | |
|---|---|---|---|---|
| JP | | 2018095148 A | 6/2018 | |
| JP | | 6408585 B2 | 10/2018 | |
| WO | WO-2019133964 A1 | * | 7/2019 | ............ B60T 13/62 |
| WO | WO-2019197555 A1 | * | 10/2019 | ............ B60T 13/142 |

* cited by examiner

VEHICLE CONTROL DEVICE

TECHNICAL FIELD

The present disclosure relates to a vehicle control device.

BACKGROUND ART

In a current vehicle, a function of autonomously controlling a speed during a parking process is increasingly provided. The function recognizes the surrounding situation of the vehicle and the like by various sensors, and automatically controls the vehicle speed adjustment to the parking position.

At this time, in general, the speed of the vehicle is adjusted by dynamically controlling the driving force and the braking force in parallel.

Furthermore, Patent Literature 1 discloses a system that automatically controls the speed of a vehicle, where when a hydraulic brake cannot generate a braking force due to a failure, an electric brake (parking brake) generates a braking force with good responsiveness instead, thereby improving safety.

CITATIONS LIST

Patent Literature

Patent Literature 1: Japanese Patent Publication No. 6408585

SUMMARY

Technical Problems

However, in the related art, when the driving force and the braking force are dynamically controlled in parallel depending on a state of a road such as a slope, control interference may occur due to a difference in respective control responsiveness and accuracy, and control may be complicated to prevent the control interference. In addition, in a case where there is a failure in the hydraulic brake, there may be a delay in the control device of the electric brake detecting the failure, and in a case where the hydraulic brake and the control device of the electric brake are integrated, the target braking force may not be realized by the electric brake.

Therefore, an object of the present disclosure is to provide a highly safe vehicle control device capable of simplifying the control of the driving force and the braking force.

Solutions to Problems

The present disclosure relates to, for example, a vehicle control device including a driving force control unit that controls a driving force generated by a wheel of a vehicle; and a braking force control unit that controls a braking force generated by the wheel; where the driving force control unit generates the driving force of a first prescribed amount and the braking force control unit generates the braking force of a second prescribed amount to control the speed of the vehicle to be constant; and acceleration or deceleration are both controllable by performing one of control of the driving force by the driving force control unit and control of the braking force by the braking force control unit. In a case where the speed of the vehicle is controlled to be constant, the first prescribed amount and the second prescribed amount have the same value when the vehicle is traveling on a flat ground, and the second prescribed amount has a value different from the first prescribed amount in consideration of gravitational acceleration when the vehicle is traveling on an uphill or a downhill.

DESCRIPTION OF EMBODIMENTS

Hereinafter, exemplary embodiments of the present disclosure (first embodiment to third embodiment) will be disclosed. The configurations of the embodiments shown below, and the operations and results (effects) provided by the configurations are merely examples. The invention here can also be realized with configurations other than the configurations disclosed in the following embodiments. Furthermore, according to the present disclosure, it is possible to obtain at least one of the various effects (including derivative effects) obtained by the following configuration.

First Embodiment

Figure 1:
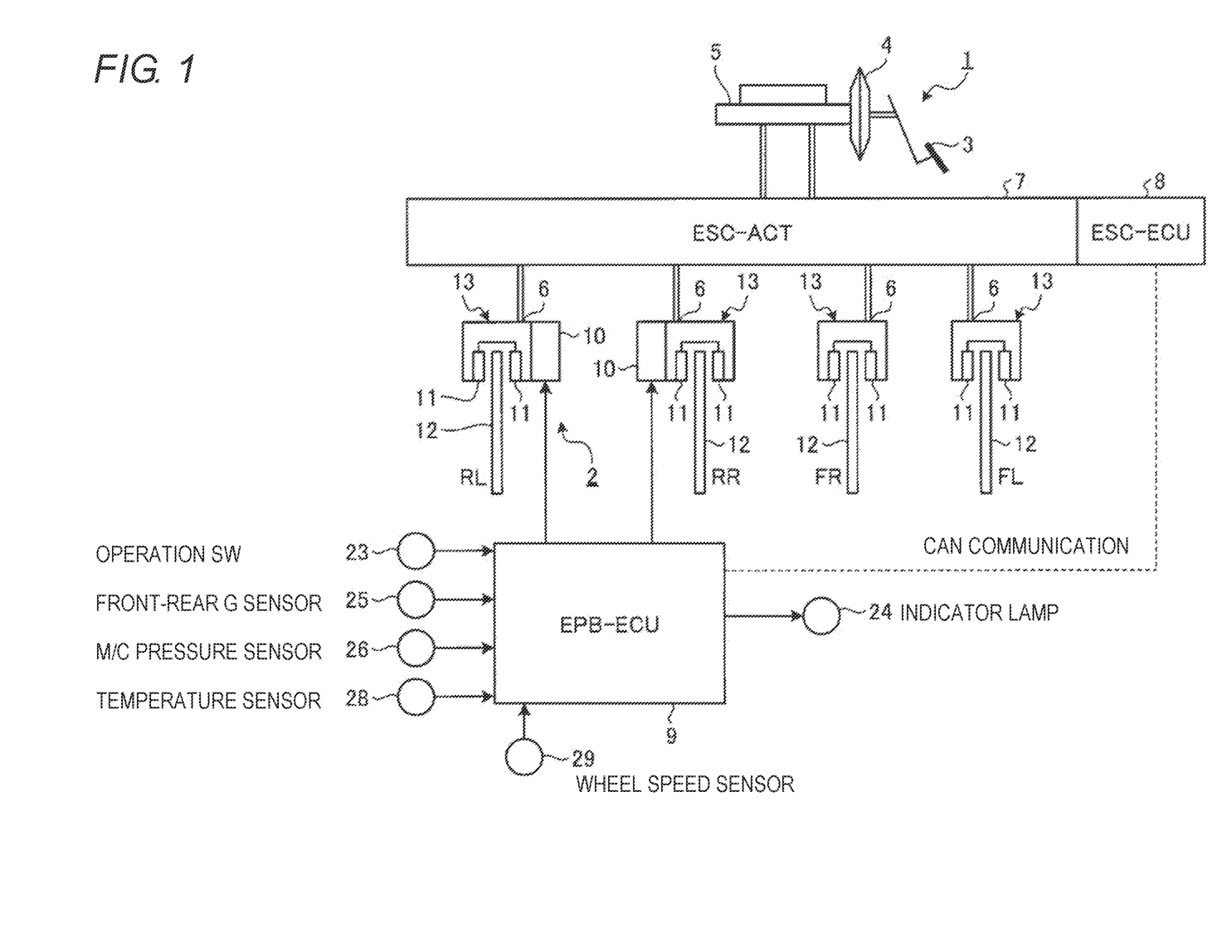
FIG. 1 is a schematic view showing an overall outline of a vehicle brake device according to a first embodiment.
Figure 2:
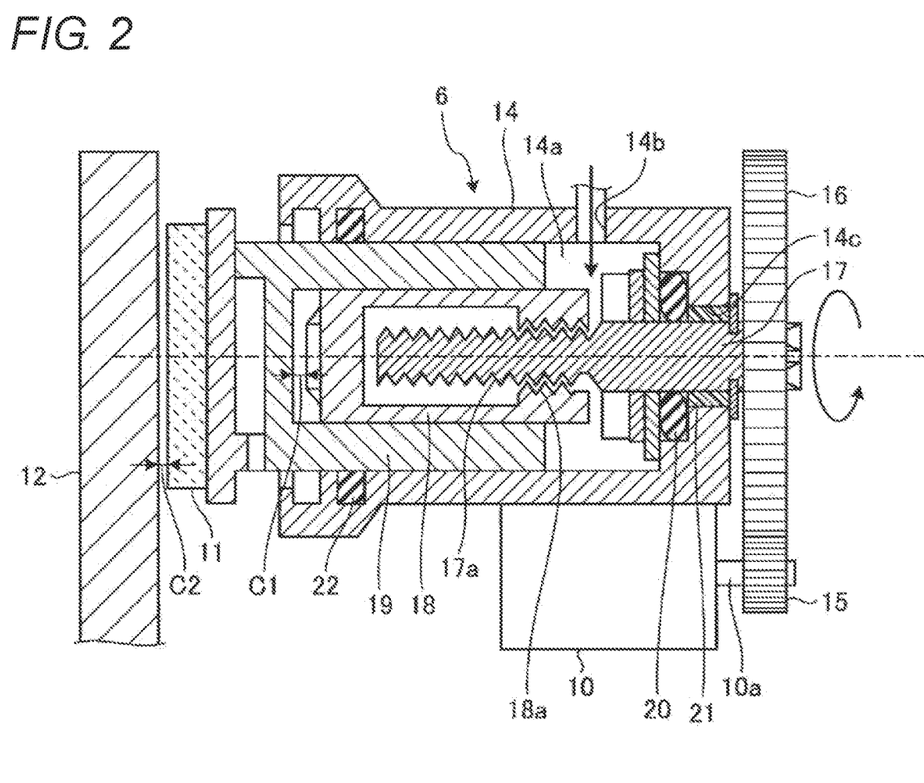
FIG. 2 is a schematic cross-sectional view of a wheel brake mechanism of a rear wheel system provided in the vehicle brake device of the first embodiment.

In a first embodiment, a vehicle brake device in which a disc brake type electric parking brake (EPB) is applied to a rear wheel system will be described by way of an example. FIG. 1 is a schematic view showing an overall outline of a vehicle brake device according to a first embodiment. FIG. 2 is a schematic cross-sectional view of a wheel brake mechanism of the rear wheel system provided in the vehicle brake device of the first embodiment. Hereinafter, description will be given with reference to these drawings.

As shown in FIG. 1, a vehicle brake device of a first embodiment includes a service brake 1 (hydraulic brake device) and an EPB 2 (electric brake device).

The service brake 1 is a hydraulic brake mechanism that presses a brake pad 11 by hydraulic pressure toward a brake disc 12 that rotates integrally with a wheel based on a depression of a brake pedal 3 by a driver to generate a service brake force (hydraulic braking force). Specifically, the service brake 1 boosts a pedaling force corresponding to the depression of the brake pedal 3 by the driver with a booster 4, and then generates a brake hydraulic pressure corresponding to the boosted pedaling force in a master cylinder (hereinafter referred to as M/C) 5. Then, the brake hydraulic pressure is transmitted to a wheel cylinder (hereinafter, referred to as W/C) 6 provided in a wheel brake mechanism of each wheel to generate a service brake force. Furthermore, an actuator 7 for controlling brake hydraulic pressure is provided between the M/C 5 and the W/C 6. The actuator 7 adjusts the service brake force generated by the service brake 1 and performs various controls (e.g., anti-skid control etc.) for improving the safety of the vehicle.

Various controls using the actuator 7 are executed by an electronic stability control (ESC)-ECU 8 that controls the service brake force. For example, the ESC-ECU 8 outputs a control current for controlling various control valves (not shown) provided in the actuator 7 and a motor for driving the pump to control the hydraulic circuit provided in the actuator 7, and control the W/C pressure transmitted to the W/C 6. Wheel slip is thereby avoided, for example, and the safety of the vehicle is improved.

For example, the actuator 7 is configured to include, for each wheel, a pressure increasing control valve that controls the application of the brake hydraulic pressure generated in the M/C 5 or the brake hydraulic pressure generated by the pump drive with respect to the W/C 6, a pressure decreasing control valve that decreases the W/C pressure by supplying brake fluid in each W/C 6 to a reservoir, and the like, and performs pressure increasing, maintaining, and decreasing control of the W/C pressure. Furthermore, the actuator 7 can realize the automatic pressurizing function of the service brake 1, and based on the control of the pump drive and various control valves, can automatically pressurize the W/C 6 even in a state where there is no brake operation.

The EPB 2 generates an electric braking force by driving the wheel brake mechanism by the motor 10, and is configured to include an EPB-ECU 9 (braking force control unit) that controls the drive of the motor 10. Specifically, for example, the EPB 2 presses the brake pad 11 toward the brake disc 12 by driving the motor 10 to generate the electric braking force so that the vehicle does not move unintentionally when parked. The EPB-ECU 9 and the ESC-ECU 8 transmit and receive information by, for example, Controller Area Network (CAN) communication.

The wheel brake mechanism is a mechanical structure that generates a brake force in the vehicle brake device of the first embodiment, and has a structure in which a wheel brake mechanism of the front wheel system first generates a service brake force by the operation of the service brake 1. On the other hand, the wheel brake mechanism of the rear wheel system has a shared structure that generates a brake force for both the operation of the service brake 1 and the operation of the EPB 2. The wheel brake mechanism of the front wheel system is a wheel brake mechanism that has been conventionally used in general, in which a mechanism for generating the electric braking force based on the operation of the EPB 2 is omitted, as opposed to the wheel brake mechanism of the rear wheel system, and thus the description thereof will be omitted here, and the wheel brake mechanism of the rear wheel system will be described below.

In the wheel brake mechanism of the rear wheel system, not only when the service brake 1 is operated but also when the EPB 2 is operated, the brake pad 11, which is the friction material shown in FIG. 2, is pressed to sandwich the brake disc 12 (12RL, 12RR, 12FR, 12FL) which is a friction object material by the brake pad 11, thus generating a friction force between the brake pad 11 and the brake disc 12, and generating a brake force.

Specifically, the wheel brake mechanism rotates the motor 10 directly fixed to a body 14 of the W/C 6 for pressing the brake pad 11 as shown in FIG. 2 in a caliper 13 shown in FIG. 1 to rotate a spur gear 15 provided on a drive shaft 10a of the motor 10. Then, the brake pad 11 is moved by transmitting the rotational force (output) of the motor 10 to a spur gear 16 engaged with the spur gear 15, and the electric braking force by the EPB 2 is generated.

In the caliper 13, in addition to the W/C 6 and the brake pad 11, a part of the end face of the brake disc 12 is housed so as to be sandwiched by the brake pad 11. The W/C 6 can generate the W/C pressure in a hollow portion 14a, which is the brake fluid accommodation chamber, by introducing the brake hydraulic pressure into the hollow portion 14a of the cylindrical body 14 through a passage 14b, and is configured to include a rotary shaft 17, a propulsion shaft 18, a piston 19, and the like in the hollow portion 14a.

The rotary shaft 17 has one end connected to the spur gear 16 through an insertion hole 14c formed in the body 14, so that when the spur gear 16 is turned, the rotary shaft 17 is turned with the turning of the spur gear 16. A male screw groove 17a is formed on the outer peripheral surface of the rotary shaft 17 at the end of the rotary shaft 17 opposite to the end connected to the spur gear 16. On the other hand, the other end of the rotary shaft 17 is axially supported by being inserted into the insertion hole 14c. Specifically, the insertion hole 14c is provided with a bearing 21 together with an O-ring 20, so that the O-ring 20 prevents the brake fluid from leaking out between the rotary shaft 17 and the inner wall surface of the insertion hole 14c, and the bearing 21 axially supports the other end of the rotary shaft 17.

The propulsion shaft 18 is configured by a nut including a hollow tubular member, and has a female screw groove 18a to be screw fitted with the male screw groove 17a of the rotary shaft 17 formed on the inner wall surface. The propulsion shaft 18 is configured, for example, in a circular column shape or a polygonal column shape provided with a key for preventing rotation, so that even if the rotary shaft 17 is turned, it cannot be turned about the turning center of the rotary shaft 17. Therefore, when the rotary shaft 17 is turned, the rotational force of the rotary shaft 17 is converted to a force for moving the propulsion shaft 18 in the axial direction of the rotary shaft 17 by the engagement between the male screw groove 17a and the female screw groove 18a. When the drive of the motor 10 is stopped, the propulsion shaft 18 stops at the same position due to the frictional force from the engagement between the male screw groove 17a and the female screw groove 18a, where if the drive of the motor 10 is stopped when the target electric braking force is obtained, the propulsion shaft 18 can be held at that position, desired electric braking force can be maintained and self-locking (hereinafter simply referred to as "lock") can be performed.

The piston 19 is arranged so as to surround the outer periphery of the propulsion shaft 18, and is formed by a bottomed cylindrical member or a polygonal cylindrical member and arranged such that the outer peripheral surface comes into contact with the inner wall surface of the hollow portion 14a formed in the body 14. A structure is such that a seal member 22 is provided on the inner wall surface of the body 14 and W/C pressure can be applied to the end face of the piston 19 so that brake fluid does not leak out between the outer peripheral surface of the piston 19 and the inner wall surface of the body 14. The seal member 22 is used to generate a reaction force for returning the piston 19 at the time of release control after the lock control. Since the seal member 22 is provided, basically, even if the brake pad 11 and the piston 19 are pushed in within a range not exceeding the elastic deformation amount of the seal member 22 by the tilted brake disc 12 during pivoting, they are pushed back toward the brake disc 12 so that the gap between the brake disc 12 and the brake pad 11 is held at a predetermined clearance (clearance C2 in FIG. 2).

In addition, to prevent the piston 19 from turning about the turning center of the rotary shaft 17 even if the rotary shaft 17 rotates, when the propulsion shaft 18 is provided with a rotation prevention key, the piston is provided with a key groove in which the key slides, and when the propulsion shaft 18 has a polygonal column shape, the piston has a polygonal cylindrical shape corresponding thereto.

The brake pad 11 is arranged at the distal end of the piston 19, and the brake pad 11 is moved in the left-right direction in the plane of drawing accompanying the movement of the piston 19. Specifically, the piston 19 is movable in the left direction in the plane of drawing accompanying the movement of the propulsion shaft 18, and is movable in the left direction in the plane of drawing independently from the propulsion shaft 18 when the W/C pressure is applied to the end of the piston 19 (the end opposite to the end where the brake pad 11 is arranged). Then, if the brake hydraulic pressure in the hollow portion 14a is not applied (W/C pressure=0) when the propulsion shaft 18 is at the release position (the state before the motor 10 is rotated), which is the standby position in the normal release, the piston 19 is moved in the right direction in the plane of drawing by the elastic force of the seal member 22 to be described later, and the brake pad 11 can be separated away from the brake disc 12.

Furthermore, when the motor 10 is rotated and the propulsion shaft 18 is moved in the left direction in the plane of drawing from the initial position, even if the W/C pressure becomes zero, the movement of the piston 19 in the right direction in the plane of drawing is regulated by the moved propulsion shaft 18 and the brake pad 11 is held in place. A clearance C1 in FIG. 2 indicates the distance between the distal end of the propulsion shaft 18 and the piston 19. After the release of the EPB is completed, the propulsion shaft 18 is fixed in position with respect to the body 14.

In the wheel brake mechanism configured as described above, when the service brake 1 is operated, the piston 19 is moved in the left direction in the plane of drawing based on the W/C pressure generated thereby so that the brake pad 11 is pressed against the brake disc 12 and the service brake force is generated. Furthermore, when the EPB 2 is operated, the spur gear 15 is rotated by driving the motor 10, and the spur gear 16 and the rotary shaft 17 are accordingly rotated, so that the propulsion shaft 18 is moved toward the brake disc 12 (left direction in the plane of drawing) based on the engagement between the male screw groove 17a and the female screw groove 18a. The distal end of the propulsion shaft 18 thereby abuts the piston 19 and presses the piston 19, whereby the piston 19 is also moved in the same direction, so that the brake pad 11 is pressed against the brake disc 12 and an electric braking force is generated. Therefore, a shared wheel brake mechanism that generates a brake force for both the operation of the service brake 1 and the operation of the EPB 2 can be adopted.

In the vehicle brake device of the first embodiment, it is possible to confirm the generation state of the electric braking force by the EPB 2 or recognize the current detection value by confirming the current detection value of a current sensor (not shown) for detecting the current of the motor 10.

A front-rear G sensor 25 detects G (acceleration rate) in the front-rear direction (advancing direction) of the vehicle and transmits a detection signal to the EPB-ECU 9.

An M/C pressure sensor 26 detects the M/C pressure in the M/C 5 and transmits a detection signal to the EPB-ECU 9.

A temperature sensor 28 detects the temperature of the wheel brake mechanism (e.g., a brake disc) and transmits a detection signal to the EPB-ECU 9.

A wheel speed sensor 29 detects the rotation speed of each wheel and transmits a detection signal to the EPB-ECU 9. Although one wheel speed sensor 29 is actually provided for each wheel, detailed illustration and description thereof will be omitted here.

The EPB-ECU 9 is configured by a well-known microcomputer including a CPU, ROM, RAM, I/O, and the like, and performs parking brake control by controlling rotation of the motor 10 according to a program stored in ROM or the like.

The EPB-ECU 9 inputs, for example, a signal corresponding to the operation state of an operation switch (SW) 23 provided on an instrumental panel (not shown) in the vehicle compartment, and drives the motor 10 according to the operation state of the operation SW 23. Furthermore, the EPB-ECU 9 executes lock control, release control, and the like based on the current detection value of the motor 10, and recognizes that the lock control is being performed based on the control state or that the wheel is in the lock state by the lock control, and that the release control is being performed or that the wheel is in the release state (EPB release state) by the release control. Then, the EPB-ECU 9 outputs a signal for performing various displays to an indicator lamp 24 provided on the instrumental panel.

The vehicle brake device configured as described above basically performs an operation of generating a braking force in the vehicle by generating the service brake force by the service brake 1 when the vehicle is traveling. Furthermore, when the vehicle is stopped by the service brake 1, the driver performs operations such as pressing the operation SW 23 to operate the EPB 2 and generate the electric braking force thus maintaining the stopping state, and then releasing the electric braking force. That is, as the operation of the service brake 1, when the driver operates the brake pedal 3 while the vehicle is traveling, the brake hydraulic pressure generated in the M/C 5 is transmitted to the W/C 6 thus generating the service brake force. Moreover, as the operation of the EPB 2, the piston 19 is moved by driving the motor 10, and the electric braking force is generated by pressing the brake pad 11 against the brake disc 12 to have the wheels in the lock state, or the electric braking force is released by separating the brake pad 11 from the brake disc 12 to have the wheels in the release state.

Specifically, the electric braking force is generated or released by the lock/release control. In the lock control, the EPB 2 is operated by forward rotating the motor 10, the rotation of the motor 10 is stopped at a position where a desired electric braking force can be generated by the EPB 2, and this state is maintained. A desired electric braking force is thereby generated. In the release control, the EPB 2 is operated by reverse rotating the motor 10, and the electric braking force generated in the EPB 2 is released.

Furthermore, even when the vehicle is traveling, there is a case where it is effective to use the EPB 2, for example, in an emergency, during automatic driving, or when the service brake 1 fails, and thus the EPB 2 may be used in such a case. Moreover, for example, in the automatic driving, the EPB 2 may be used as means for generating the braking force.

A vehicle control device includes a driving force control unit (not illustrated) that controls a driving force generated by a wheel of a vehicle, and a braking force control unit (ESC-ECU 8, EPB-ECU 9) that controls a braking force generated by the wheel. In the first embodiment, the vehicle control device controls the speed of the vehicle to be constant by the driving force control unit generating a driving force of a first prescribed amount and the braking force control unit generating a braking force of a second prescribed amount. In a case where the speed of the vehicle is controlled to be constant, the first prescribed amount and the second prescribed amount have the same value when the vehicle is traveling on a flat ground, and the second prescribed amount has a value different from the first prescribed amount in consideration of gravitational acceleration when the vehicle is traveling on an uphill or a downhill. Both acceleration and deceleration controllable by performing one of the control of the driving force by the driving force control unit and the control of the braking force by the braking force control unit. That is, the vehicle control device can make the speed of the vehicle constant by controlling the driving force and the braking force so as to balance each other, and can realize both acceleration and deceleration by dynamically controlling one of the driving force and the braking force from this state.

Figure 3A:
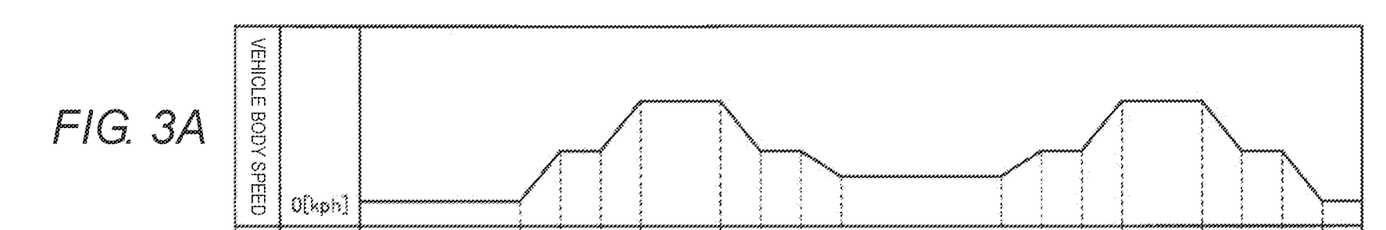
FIGS. 3A-3D are time charts illustrating an example of a state of a temporal change of each physical quantity at the time of vehicle control in the first embodiment.
Figure 3B:
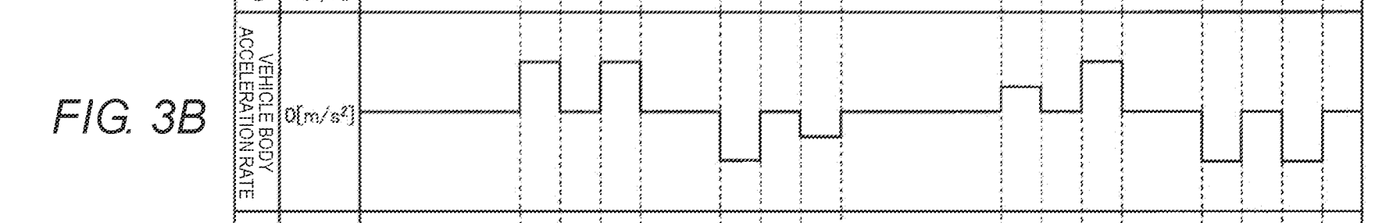
Figure 3C:
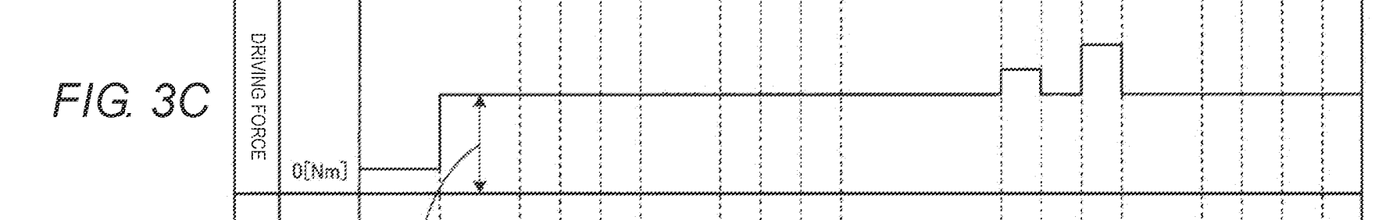
Figure 3D:
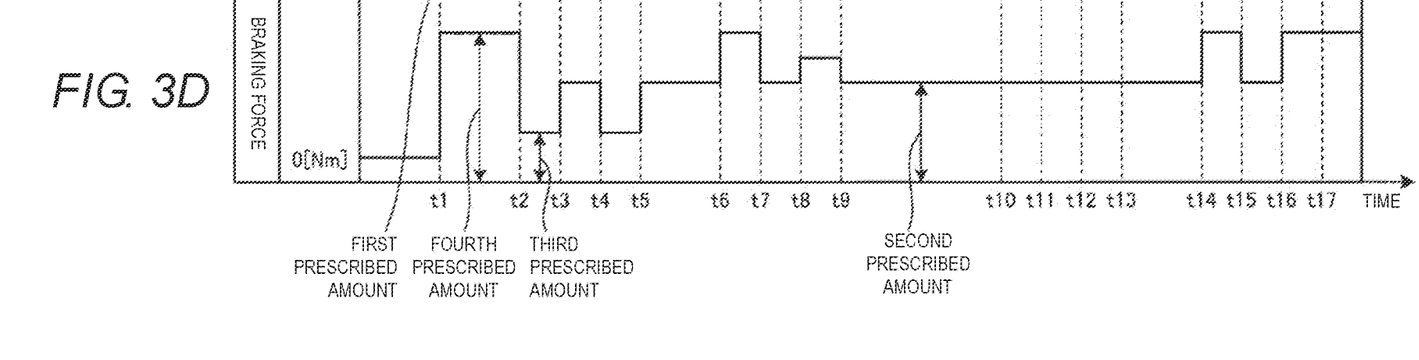

FIGS. 3A-3D are time charts illustrating an example of a state of a temporal change of each physical quantity at the time of vehicle control in the first embodiment. In FIGS. 3A-3D, FIG. 3A illustrates a vehicle body speed, FIG. 3B illustrates a vehicle body acceleration rate, FIG. 3C illustrates a driving force, and FIG. 3D illustrates a braking force (hydraulic braking force, electric braking force).

Each of the following embodiments illustrates an example of a situation in which the vehicle travels on a flat ground, and thus, the first prescribed amount generated by the driving force control unit and the second prescribed amount generated by the braking force control unit have the same value. As described above, in a situation where the vehicle travels uphill or downhill, the first prescribed amount and the second prescribed amount indicate different values.

Both the driving force and the braking force are generated at time t1 when the vehicle is stopped, but the stopping state of the vehicle can be maintained by increasing the braking force. Thereafter, when the vehicle is to be started at time t2, the vehicle can be started by lowering the braking force to be less than or equal to the driving force while keeping the driving force fixed.

Thereafter, until time t9, the vehicle can be accelerated in a time zone in which the driving force is larger than the braking force, and the vehicle can be decelerated in a time zone in which the driving force is smaller than the braking force by dynamically controlling the braking force while keeping the driving force fixed.

Thereafter, from time t9 to time t10, the vehicle body acceleration rate can be made zero and the vehicle body speed can be made constant by balancing the driving force and the braking force.

In addition, from time t10 to time t13, the vehicle can be accelerated in a time zone in which the driving force is larger than the braking force, and the vehicle can be decelerated in a time zone in which the driving force is smaller than the braking force by dynamically controlling the driving force while keeping the braking force fixed.

Thereafter, from time t13 to time t14, the vehicle body acceleration rate can be made zero and the vehicle body speed can be made constant by balancing the driving force and the braking force.

Moreover, after time t14, the vehicle can be accelerated in a time zone in which the driving force is larger than the braking force, and the vehicle can be decelerated in a time zone in which the driving force is smaller than the braking force by dynamically controlling the braking force while keeping the driving force fixed.

Figure 4:
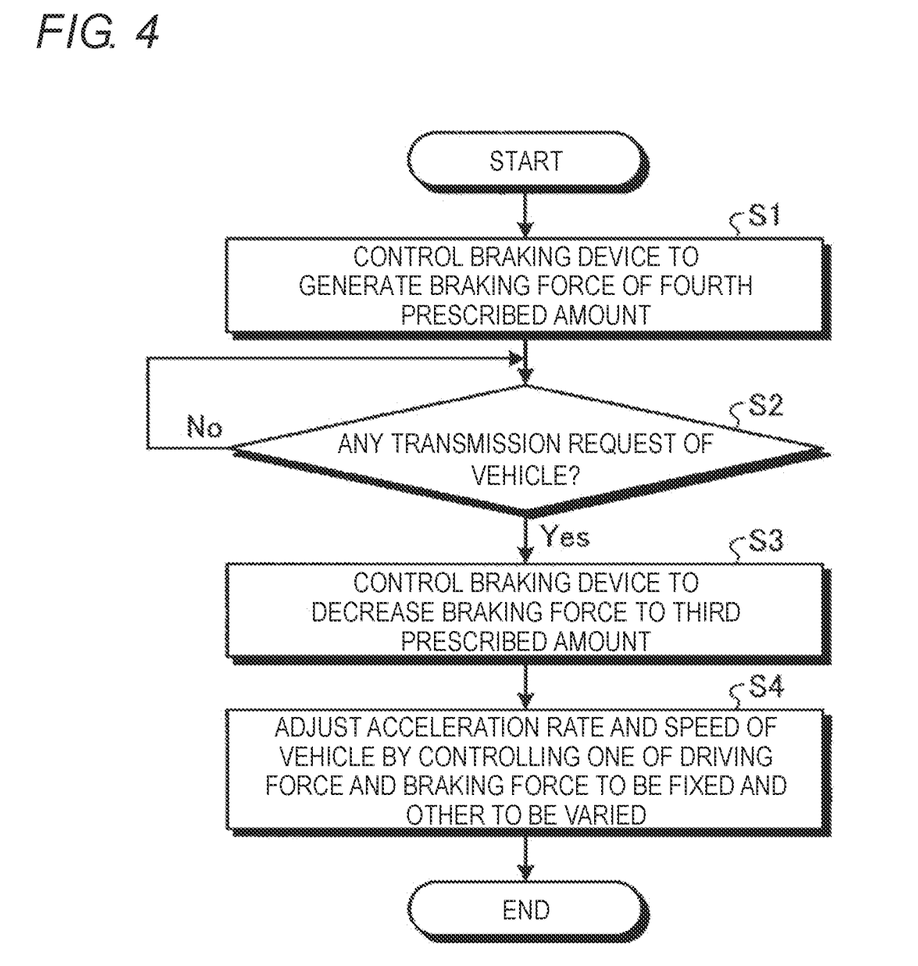
FIG. 4 is a flowchart showing a process performed by the vehicle control device of the first embodiment.

FIG. 4 is a flowchart showing a process performed by the vehicle control device of the first embodiment. In the following description, the description of the driving force control is omitted, but the driving force as illustrated in FIG. 3C is assumed to be generated.

While the vehicle is stopped, in step S1 (time t1 in FIGS. 3A-3D), the braking force driving unit (at least one of ESC-ECU 8 and EPB-ECU 9) controls the braking device (at least one of service brake 1 and EPB 2) to generate the braking force of a fourth prescribed amount (magnitude of the braking force at times t1 to t2 in FIG. 3D) larger than the second prescribed amount.

Next, in step S2, the vehicle control device determines whether there is a start request of the vehicle (for example, at the time of start operation by the driver or at the time of start determination in automatic driving (including automatic parking)), where the process proceeds to step S3 in a case of Yes, and the process returns to step S2 in a case of No.

In step S3 (time t2 in FIGS. 3A-3D), the braking force driving unit controls the braking device to lower the braking force to a third prescribed amount (magnitude of the braking force at times t2 to t3 in FIG. 3D) smaller than the second prescribed amount.

In step S4, the vehicle control device adjusts the acceleration rate and speed of the vehicle by controlling one of the driving force and the braking force to be fixed and the other to be varied (after time t2 in FIGS. 3A-3D).

As described above, according to the vehicle control device of the first embodiment, since the acceleration rate and the speed of the vehicle can be adjusted by controlling one of the driving force and the braking force to be fixed and the other to be varied, the control of the driving force and the braking force can be simplified and the safety can be enhanced.

For example, in a case where the vehicle travels on a road where the vehicle repeatedly moves up and down, when the driving force and the braking force are dynamically controlled in parallel as in the related art, problems that not only the control becomes complicated, but also the driving force and the braking force are unnecessarily generated, or the control becomes unstable and the ride comfort deteriorates arise. On the other hand, according to the vehicle control device of the first embodiment, since the acceleration rate and speed of the vehicle can be adjusted by controlling one of the driving force and the braking force to be fixed and the other to be varied, the control is simplified, and the occurrence of such problems can be avoided or reduced.

Second Embodiment

Next, a second embodiment will be described. The description on the matters same as in the first embodiment will be omitted as appropriate. The service brake 1 and the EPB 2 are configured such that a larger braking force acts selectively. Specifically, when the motor 10 is stopped in a state where the propulsion shaft 18 illustrated in FIG. 2 is moved in the left direction of the drawing, the electric braking force is maintained even if there is no hydraulic pressure, and when there is hydraulic braking force larger than the electric braking force, the hydraulic braking force is generated. Therefore, if the propulsion shaft 18 is moved in the left direction in the drawing to some extent, a situation in which the braking force becomes zero can be avoided even when the hydraulic brake device fails, and a vehicle control with higher safety can be realized.

Furthermore, the EPB 2 is an example of a brake device with a braking force holding mechanism capable of holding the braking force before the energy supply for the generation of the braking force disappears even after the energy supply disappears. Then, while the vehicle is traveling, the braking force control unit controls the EPB 2 to generate the electric braking force of greater than or equal to the third prescribed amount smaller than the second prescribed amount, thereby reducing the influence on the control in the normal time. The brake device with the braking force holding mechanism is not limited to the EPB, and may be configured such that the hydraulic pressure can be held at the time of failure by, for example, a normally closed electromagnetic valve and the like. According to such a configuration, the braking force of greater than or equal to the second prescribed amount can be generated and the hydraulic pressure can be held even in a case where a failure occurs. Here, the energy is a current supplied to rotate the motor 10 when the brake device with a braking force holding function is the EPB 2, and is a current supplied to open and close the electromagnetic valve when the brake device with a braking force holding mechanism is the electromagnetic valve.

Figure 5A:
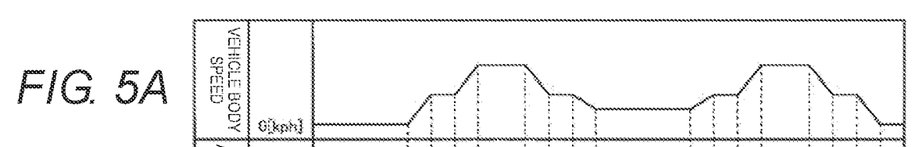
FIGS. 5A-5F are time charts illustrating an example of a state of a temporal change of each physical quantity at the time of vehicle control in a second embodiment.
Figure 5B:
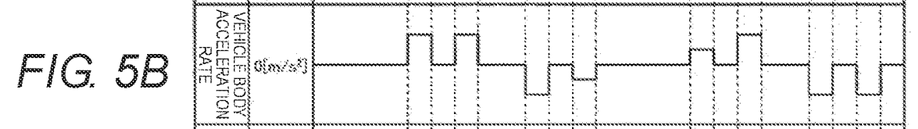
Figure 5C:
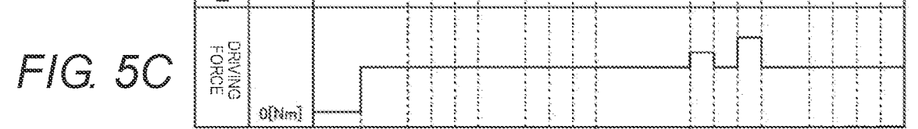
Figure 5D:
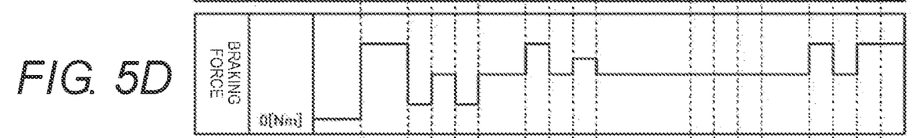
Figure 5E:
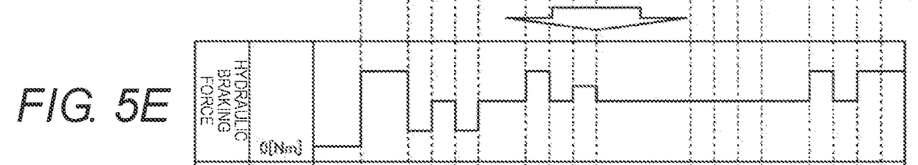
Figure 5F:
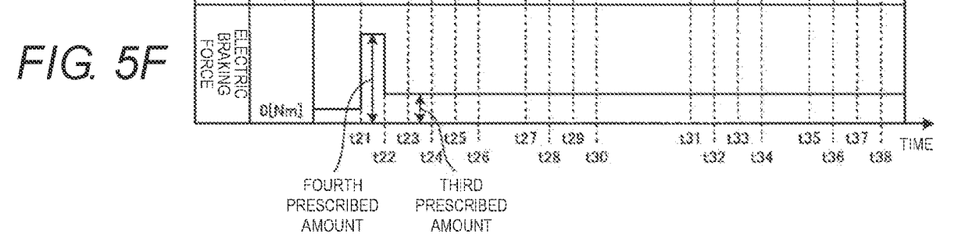

FIGS. 5A-5F are time charts illustrating an example of a state of a temporal change of each physical quantity at the time of vehicle control in the second embodiment. In FIGS. 5A-5F, FIG. 5A illustrates a vehicle body speed, FIG. 5B illustrates a vehicle body acceleration rate, FIG. 5C illustrates a driving force, and FIG. 5D illustrates a braking force. Furthermore, FIG. 5E illustrates a hydraulic braking force, and FIG. 5F illustrates an electric braking force. The larger of the hydraulic braking force and the electric braking force selectively acts as the braking force, that is, the braking force of FIG. 5D corresponds to the larger one of the hydraulic braking force of FIG. 5E and the electric braking force of FIG. 5F at each time.

At time t21 when the vehicle is stopped, both the driving force and the braking force are generated, but the stopping state of the vehicle can be maintained by increasing the braking force. The electric braking force is increased to the fourth prescribed amount at time t21, decreased to the third prescribed amount at time t22, and such state is maintained thereafter. On the other hand, the hydraulic braking force is increased to the fourth prescribed amount at time t21, and decreased to the third prescribed amount at time t23 when the vehicle is to be started. That is, at time t23, the vehicle can be started by decreasing the braking force to less than or equal to the driving force while keeping the driving force fixed. Thereafter, until time t30, the vehicle can be accelerated in a time zone in which the driving force is larger than the braking force, and the vehicle can be decelerated in a time zone in which the driving force is smaller than the braking force by dynamically controlling the hydraulic braking force while keeping the driving force fixed.

Thereafter, from time t30 to time t31, the hydraulic braking force is maintained equal to the driving force to balance the driving force and the braking force, so that the vehicle body acceleration rate can be made zero and the vehicle body speed can be made constant.

In addition, from time t31 to time t34, the vehicle can be accelerated in a time zone in which the driving force is larger than the braking force, and the vehicle can be decelerated in a time zone in which the driving force is smaller than the braking force by dynamically controlling the driving force while keeping the braking force fixed.

Thereafter, from time t34 to time t35, the hydraulic braking force is maintained equal to the driving force to balance the driving force and the braking force, so that the vehicle body acceleration rate can be made zero and the vehicle body speed can be made constant.

Moreover, after time t35, the vehicle can be accelerated in a time zone in which the driving force is larger than the braking force, and the vehicle can be decelerated in a time zone in which the driving force is smaller than the braking force by dynamically controlling the braking force while keeping the driving force fixed.

Figure 6A:
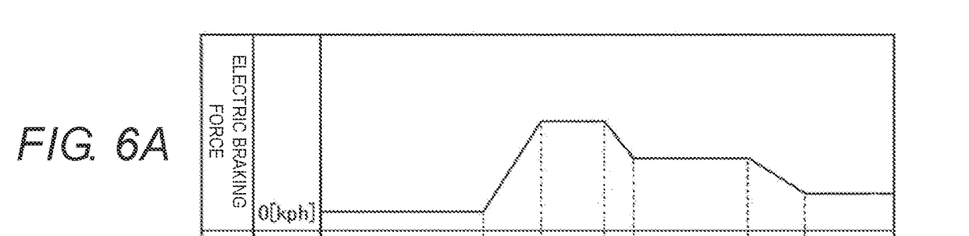
FIGS. 6A and 6B are time charts illustrating an example of a state of a temporal change of each physical quantity when an electric braking force is decreased before the vehicle start in the second embodiment.
Figure 6B:
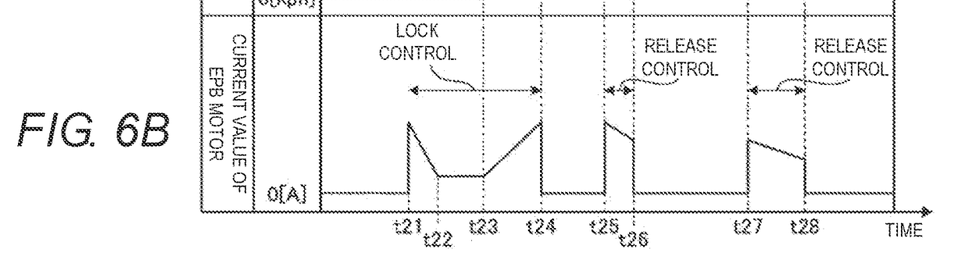

Here, FIGS. 6A and 6B are time charts illustrating an example of a state of a temporal change of each physical quantity when the electric braking force is decreased before the vehicle start (time t22 in FIGS. 5A-5F) in the second embodiment. In FIGS. 6A and 6B, FIG. 5A illustrates the electric braking force, and FIG. 5B illustrates the EPB motor current value (current value of the motor 10).

While the vehicle is stopped, the EPB-ECU 9 controls the EPB 2 to generate the electric braking force of a fourth prescribed amount larger than the second prescribed amount (time t21 in FIG. 5F), and then controls the EPB 2 to decrease the electric braking force to the third prescribed amount before starting the vehicle (time t22 in FIG. 5F).

Furthermore, when controlling the EPB 2 to decrease the electric braking force to the third prescribed amount before starting the vehicle, the EPB-ECU 9 adjusts the electric braking force by estimating the electric braking force based on the current characteristic (for example, "EPB motor current value" in FIG. 6B) of the motor 10 (braking mechanism driving motor) in the release control for releasing the electric braking force. That is, the EPB-ECU 9 performs the lock control at times t21 to t24 in FIGS. 6A and 6B based on the EPB motor current value, and then performs the release control at times t25 to t26 to decrease the electric braking force to a desired value. Furthermore, thereafter, the EPB-ECU 9 can decrease the electric braking force to another desired value by performing the release control at times t27 to t28 in FIGS. 6A and 6B based on the EPB motor current value.

Figure 7:
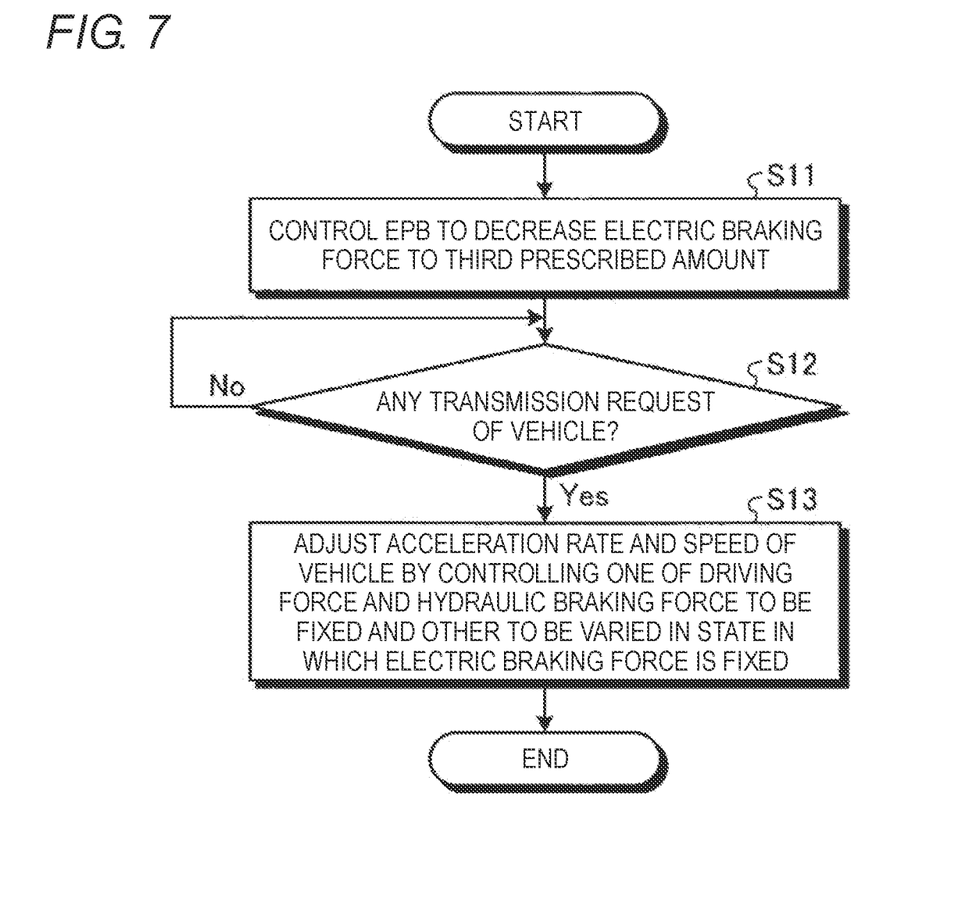
FIG. 7 is a flowchart showing a process performed by the vehicle control device of the second embodiment.

FIG. 7 is a flowchart showing a process performed by the vehicle control device of the second embodiment. Here, the starting point is immediately after time t21 in FIGS. 5A-5F. While the vehicle is stopped, in step S11 (time t22 in FIGS. 5A-5F), the EPB-ECU 9 controls the EPB 2 to decrease the electric braking force to a third prescribed amount (magnitude of the electric braking force after time t22 in FIG. 5D).

Next, in step S12, the vehicle control device determines whether there is a start request of the vehicle (for example, at the time of start operation by the driver or at the time of start determination in automatic driving (including automatic parking)), where the process proceeds to step S13 in a case of Yes, and the process returns to step S12 in a case of No.

In step S13, the vehicle control device adjusts the acceleration rate and speed of the vehicle by controlling one of the driving force and the hydraulic braking force to be fixed and the other to be varied in a state where the electric braking force is fixed (after time t22 in FIGS. 5A-5F).

As described above, according to the vehicle control device of the second embodiment, since the acceleration rate and the speed of the vehicle can be adjusted by controlling one of the driving force and the hydraulic braking force to be fixed and the other to be varied in a state where the electric braking force is fixed, the control of the driving force and the braking force can be simplified.

Furthermore, responsiveness can be improved as compared with the conventional method in which the lock control is performed after the release control is completed to adjust the electric braking force, by stopping the release operation in the middle of the release control and adjusting the electric braking force.

In addition, the idle stroke and the air gap of the EPB 2 are removed even when the service brake 1 fails (stops due to failure, power shortage, or the like) by maintaining the electric braking force in the state of the third prescribed amount even while the vehicle is traveling, so that the EPB 2 can be rapidly operated to realize the necessary braking force.

For example, in an assist system (vehicle control device) of the related art, in order to remove an idle stroke and an air gap of a brake device before automatic driving is executed, a parking brake is operated within a range in which a braking action is not generated, and when a failure of a foot brake or a foot brake facility (hydraulic brake device) which is a normal brake device occurs, a driving torque of an engine partially reduces on an uphill, and the driving torque entirely reduces on a downhill. When the hydraulic brake device fails, it is necessary to secure the safety of the occupant by stopping the vehicle at a safe place, but such a problem is not considered in this related art, and the vehicle speed cannot be accurately controlled only by the deceleration control of the driving torque as described above, and hence there is a possibility that the vehicle cannot be stopped at a safe place depending on a change in the peripheral situation.

On the other hand, according to the vehicle control device of the second embodiment, even when the hydraulic brake device becomes inoperable, both acceleration and deceleration of the vehicle can be realized with high accuracy by dynamically controlling the driving force since the electric braking force is maintained at the third prescribed amount, whereby the vehicle can be moved to a desired location (destination, safe place, etc.) according to the peripheral situation, so that the safety of the occupant can be secured.

In addition, the clearance filling in the EPB 2 can be accurately performed without being affected by the hydraulic pressure by generating the electric braking force in a state where there is no hydraulic braking force before the vehicle start.

Third Embodiment

Next, a third embodiment will be described. Description of matters similar to at least one of the first embodiment and the second embodiment will be omitted as appropriate. In the third embodiment, while the vehicle is traveling, the EPB-ECU 9 determines whether the EPB 2 is normally operating based on the relationship between the driving force and the acceleration rate of the vehicle when outputting an instruction to control the EPB 2 to generate the electric braking force. That is, it is not known how much the EPB 2 can generate the electric braking force when the hydraulic braking force is being generated, and thus the failure detection of the EPB 2 is performed in the following manner.

FIGS. 8A-8F are time charts illustrating an example of a temporal change of each physical quantity at the time of vehicle control in the third embodiment. The description on the matters same as FIGS. 5A-5F will be omitted as appropriate. Times t41 to t50 and t52 to t59 in FIGS. 8A-8F correspond to times t21 to t38 in FIGS. 5A-5F. In FIGS. 8A, 8B, 8D, and 8F, a solid line indicates a target value, and a broken line indicates an actual value.

Figure 8A:
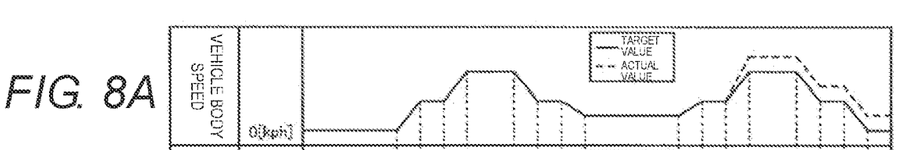
FIGS. 8A-8F are time charts illustrating an example of a state of a temporal change of each physical quantity at the time of vehicle control in a third embodiment.
Figure 8B:
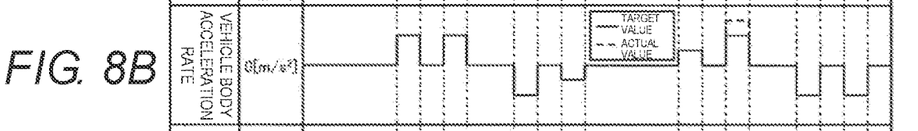
Figure 8C:
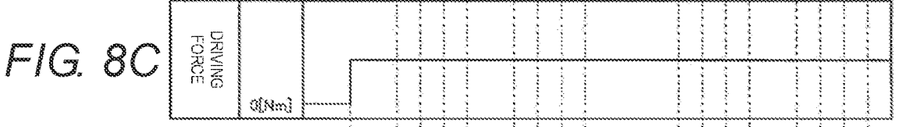
Figure 8D:
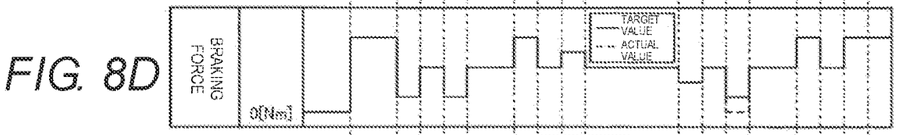
Figure 8E:
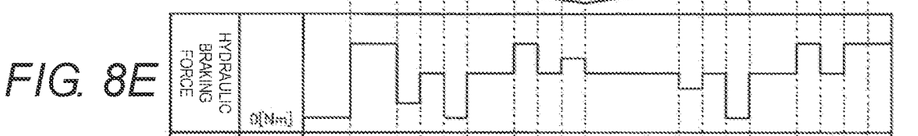
Figure 8F:
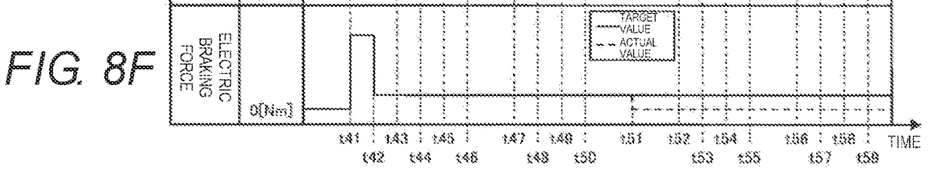

As illustrated in FIG. 8F, it is assumed that the EPB 2 fails at time t51, and thereafter, the electric braking force becomes zero. In this case, since a larger one of the hydraulic braking force and the electric braking force selectively acts as the braking force at times t54 to t55, the actual value of the braking force becomes zero different from the target value as illustrated in FIG. 8D, and accordingly, the actual value of the vehicle body speed also differs from the target value as illustrated in FIG. 8A, and the actual value of the vehicle body acceleration rate also differs from the target value as illustrated in FIG. 8B. The EPB-ECU 9 can determine that the EPB 2 is abnormal on the basis of the fact that the actual value is different from the target value for the vehicle body speed and the vehicle body acceleration rate.

Figure 9:
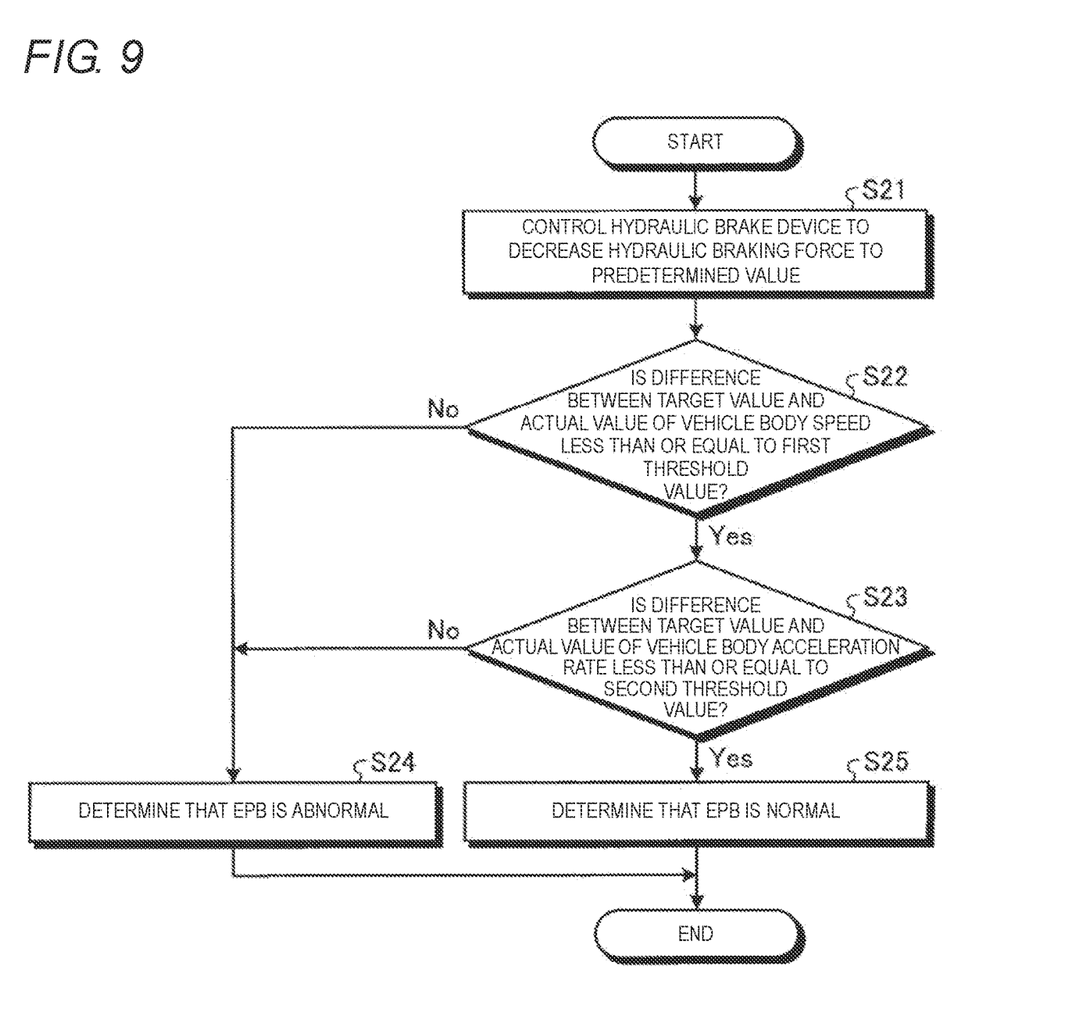
FIG. 9 is a flowchart showing a process performed by the vehicle control device of the third embodiment.

FIG. 9 is a flowchart showing a process performed by the vehicle control device of the third embodiment. In step S21 (time t54 in FIGS. 8A-8F), the ESC-ECU 8 controls the hydraulic brake device (service brake 1) to decrease the hydraulic braking force to a predetermined value (for example, zero).

Next, in step S22, the EPB-ECU 9 determines whether or not the difference between the target value and the actual value of the vehicle body speed is less than or equal to a first threshold value (predetermined vehicle body speed threshold value), where the process proceeds to step S23 in a case of Yes, and the process proceeds to step S24 in a case of No.

In step S23, the EPB-ECU 9 determines whether or not the difference between the target value and the actual value of the vehicle body acceleration rate is less than or equal to a second threshold value (predetermined vehicle body acceleration rate threshold value), where the process proceeds to step S25 in a case of Yes, and the process proceeds to step S24 in a case of No.

In step S24, the EPB-ECU 9 determines that the EPB 2 is abnormal. In this case, for example, the EPB-ECU 9 records the fact that the EPB 2 is abnormal as data or notifies the driver of the abnormality by the indicator lamp 24 or the like. In step S25, the EPB-ECU 9 determines that the EPB 2 is normal.

As described above, according to the vehicle control device of the third embodiment, when the electric braking force is generated, whether the EPB 2 is operating normally can be easily determined by simply lowering the hydraulic braking force and examining the difference between the target value and the actual value of the vehicle state quantity (acceleration rate or speed of the vehicle). Therefore, the reliability of the EPB 2 is improved.

The embodiments of the present disclosure have been exemplified above, but the embodiments described above are merely examples and are not intended to limit the scope of the invention. The embodiments described above can be implemented in various other forms, and various omissions, replacements, combinations, and changes can be made within a scope not deviating from the gist of the disclosure. In addition, specifications such as each configuration and shape (structure, type, number, etc.) can be appropriately changed and implemented.

For example, the wheel to be braked by the EPB is not limited to the rear wheel, and may be a front wheel. In addition, the number of wheels of the vehicle to which the present disclosure is applied is not limited to four, and may be six or more.

The invention claimed is:

1. A vehicle control device comprising:
a driving force control unit that controls a driving force generated by a wheel of a vehicle; and
a braking force control unit that controls a braking force generated by the wheel; wherein
the driving force control unit generates the driving force of a first prescribed amount and the braking force control unit generates the braking force of a second prescribed amount to control the speed of the vehicle to be constant;
acceleration or deceleration are both controllable by performing one of control of the driving force by the driving force control unit and control of the braking force by the braking force control unit;
the vehicle includes, as a device for generating a braking force on the wheel, a brake device with a braking force holding mechanism configured to hold the braking force before energy supply for generating the braking force disappears even after the energy supply disappears;
while the vehicle is traveling, the braking force control unit controls the brake device with the braking force holding mechanism to generate a braking force of greater than or equal to a third prescribed amount smaller than the second prescribed amount;
the vehicle includes, as a device for generating a braking force on the wheel, an electric parking brake (EPB) as the brake device with the braking force holding mechanism and a hydraulic brake device, the EPB and the hydraulic brake device being configured such that larger of the respective braking force selectively acts; and
while the vehicle is traveling, the braking force control unit determines whether the EPB is normally operating based on a relationship between the driving force and an acceleration rate of the vehicle when outputting an instruction to control the EPB to generate an electric braking force.

2. A vehicle control device comprising:
a driving force control unit that controls a driving force generated by a wheel of a vehicle; and
a braking force control unit that controls a braking force generated by the wheel; wherein
the driving force control unit generates the driving force of a first prescribed amount and the braking force control unit generates the braking force of a second prescribed amount to control the speed of the vehicle to be constant;
acceleration or deceleration are both controllable by performing one of control of the driving force by the driving force control unit and control of the braking force by the braking force control unit;
the vehicle includes, as a device for generating a braking force on the wheel, an EPB and a hydraulic brake device, the EPB and the hydraulic brake device being configured such that larger of the respective braking force selectively acts; and
while the vehicle is stopped, the braking force control unit controls the EPB to generate an electric braking force of a fourth prescribed amount larger than the second prescribed amount, and then controls the EPB to lower the electric braking force to a third prescribed amount smaller than the second prescribed amount before starting the vehicle.

3. The vehicle control device according to claim 2, wherein when controlling the EPB to lower the electric braking force to the third prescribed amount before starting the vehicle, the braking force control unit adjusts the electric braking force by estimating the electric braking force based on a current characteristic of a braking mechanism driving motor in a release control for releasing the electric braking force.

* * * * *